US006754346B2

United States Patent
Eiserling et al.

(10) Patent No.: US 6,754,346 B2
(45) Date of Patent: Jun. 22, 2004

(54) METHOD FOR TRACING THE DISTRIBUTION OF PHYSICAL DIGITAL MEDIA

(76) Inventors: Steven P. Eiserling, 4220 Gardenview Dr., Unit 181, Napperville, IL (US) 60564; Ronald M Eiserling, 610 Canyon Point Rd., Las Cruces, NM (US) 88011

(*) Notice: Subject to any disclaimer, the term of this patent is extended or adjusted under 35 U.S.C. 154(b) by 0 days.

(21) Appl. No.: 10/210,012

(22) Filed: Jul. 31, 2002

(65) Prior Publication Data

US 2004/0025038 A1 Feb. 5, 2004

(51) Int. Cl.[7] .................. G06F 17/60; H04K 1/00
(52) U.S. Cl. .................. 380/202; 705/57; 705/58
(58) Field of Search .............. 705/57–58; 380/202

(56) References Cited

U.S. PATENT DOCUMENTS

| | | | |
|---|---|---|---|
| 5,774,868 A | | 6/1998 | Cragun |
| 5,805,699 A | * | 9/1998 | Akiyama et al. ............. 705/58 |
| 6,014,647 A | | 1/2000 | Nizzari |
| 6,052,447 A | | 4/2000 | Golden |
| 6,115,545 A | | 9/2000 | Mellquist |
| 6,115,681 A | | 9/2000 | Foreman |
| 6,286,005 B1 | | 9/2001 | Cannon |
| 6,295,556 B1 | | 9/2001 | Falcon |
| 6,308,281 B1 | | 10/2001 | Hall, Jr. |
| 6,311,211 B1 | | 10/2001 | Shaw |
| 6,327,707 B1 | * | 12/2001 | McKeeth et al. ............. 717/714 |
| 6,374,259 B1 | | 4/2002 | Celik |
| 6,385,605 B1 | | 5/2002 | Suzuoka |
| 6,393,470 B1 | | 5/2002 | Kanevsky |
| 6,408,329 B1 | | 6/2002 | Kailash |

FOREIGN PATENT DOCUMENTS

WO    WO 200106404 A2 *    1/2001    .......... G06F/17/00

OTHER PUBLICATIONS

Schulman, Andrew, "Inside the Windows 95 Registration Wizard", Sep. 20, 1995, O'Reilly & Associates, entire document.*
Iannella,Renato, "Open Digital Rights Language (ODRL) Version 1.1", W3c Note 19 Sep. 2002, IPR Systems, entire document, http://www.w3.org/TR/odrl/.*
OASIS TC, "XML and Digital Rights Management (DRM)" web page, Oct. 17, 2003, http://xml.coverpages.org/drm-.html.*

* cited by examiner

Primary Examiner—Ayaz Sheikh
Assistant Examiner—Ronald Baum
(74) Attorney, Agent, or Firm—Jonathan Feuchtwang

(57) ABSTRACT

A method for tracing the distribution of physical digital media and reporting feedback to a content provider regarding whether the profile of the user of the physical digital media corresponds to known profile. Identifying data is gathered from a user's computer and transmitted to a host. The host performs pattern matching to determine whether the identifying data matches stored profile information.

10 Claims, 7 Drawing Sheets

METHOD FOR TRACING THE DISTRIBUTION OF PHYSICAL DIGITAL MEDIA

FIELD OF THE INVENTION

The present invention generally relates to a method and system for tracing the distribution of physical digital media. More particularly the present invention transmits identifying information obtained from the recipient's computer to a centralized database for pattern matching analysis, and subsequently provides feedback to a content provider regarding the recipient of the digital media.

BACKGROUND OF THE INVENTION

To date many content providers have utilized digital media for distribution of content. Traditionally, the content provider is unable to automatically verify whether the digital content were viewed by the recipient. As a result, the content provider must resort to follow-up efforts to obtain feedback. Many user's find these efforts an annoyance.

The failure to capture data regardin the recipient of the content represents a missed opportunity in that the content provider is unable to gain insight regarding the recipient's experience. The automatic collection of feedback information would enable the content provider to more efficiently utilize its resources by concentrating their efforts on only those recipients with an interest in their products or services.

Accordingly, it is an object of the present invention to automatically capture feedback information regarding the recipient and the recipient's interaction with the software on the digital medium.

An additional object of the present invention is to send the collected profile and feedback data to a remote database for analysis and pattern matching.

SUMMARY OF THE INVENTION

Disclosed is a method for tracing the distribution of physical digital media and reporting feedback to a content provider regarding whether the profile of the user of the physical digital media corresponds to known profile.

A host computer is provided with a database of user profile records. In parallel, digital content is enveloped within packaging software providing an interface for accessing the digital content. The enveloped digital content and a media identifier are stored on physical digital media, with the media identifier identifying at least one of a type of the digital content and a provider of the digital content.

The physical digital media is distributed to at least one user, who mounts and executes the digital media on a computer.

The packaging software gathers identifying data from the user's computer, encodes the identifying data into a key, and searches for an active network connection. Upon finding an active network connection, the packaging software transmits the key to the host. Otherwise, the packaging software prompts the user to initiate a network connection, and transmits the key to the host computer.

According to a further aspect of the invention, the host receives the key and decodes the key into identifying data. Pattern matching is performed to analyze matches between the identifying data and the user profile records, and information regarding matches and partial matches is reported to the content provider information.

DETAILED DESCRIPTION OF THE PREFERRED EMBODIMENTS

The present invention is a tracing system which is utilized to determine whether the actual recipient of the digital media is the targeted recipient. More particularly, the tracing tool of the present invention collects information regarding the recipient (identification information) from the recipient's computer, and transmits this information to a host. In turn, the host uses pattern matching software to compare the identification information with profile information provided prior to usage by either a third-party content provider or the recipient. The present invention provides feedback to the content provider which enables the content provider to improve and focus its marketing and sales activities.

Figure 1:
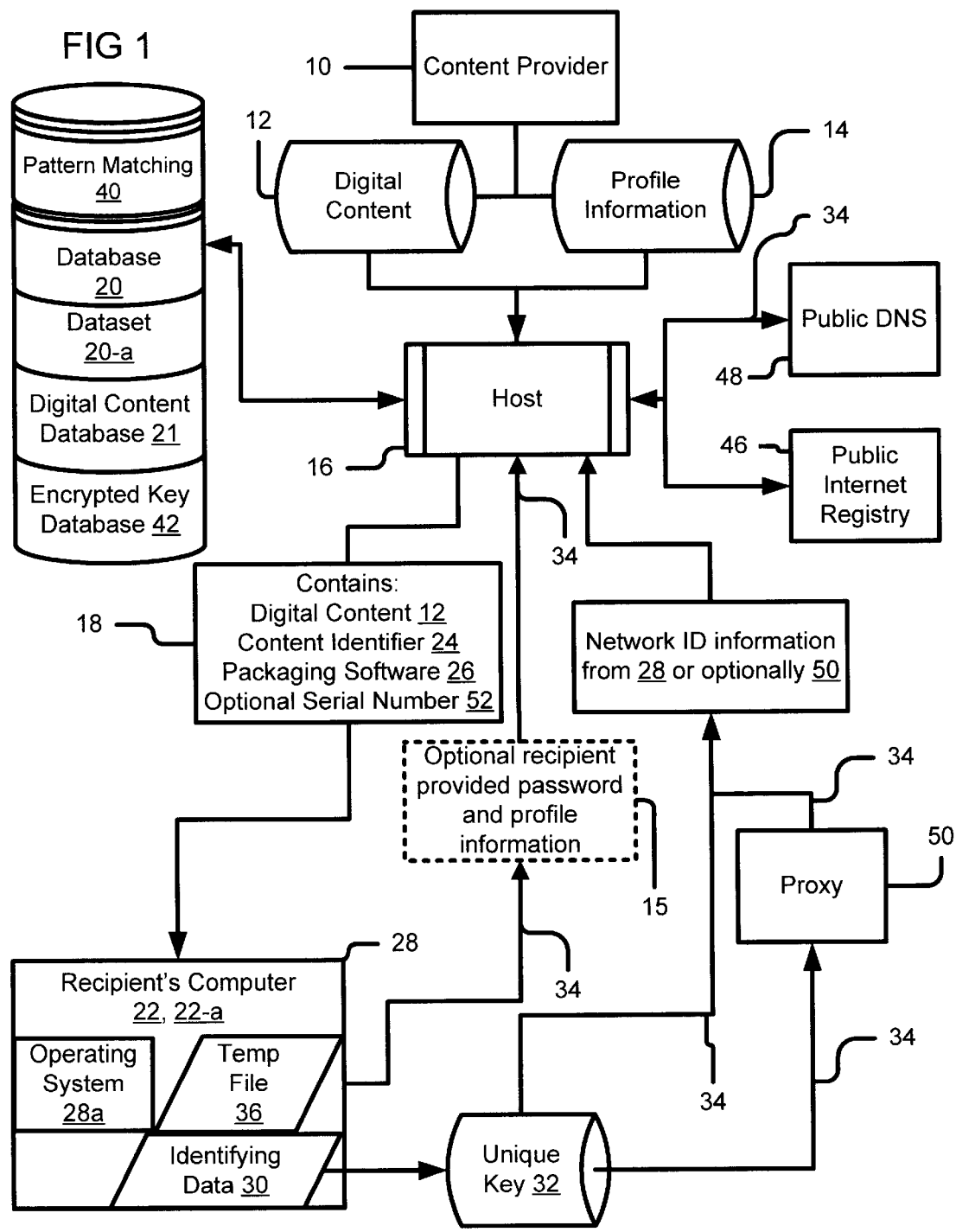
FIG. 1 is a block diagram of the system of the present invention.

FIG. 1 is a block diagram showing how the various entities interact with the system of the present invention.

As shown in FIG. 1, a content provider 10 transmits content data 12 as well as multiple records of profile information 14 to the host 16. The host 16 packages and stores the content information 12 on a digital media 18 such as a CD-ROM or the like. Moreover, the host 16 uses the profile information 14 to create a database 20.

The profile information 14 includes a variety of contact information describing an intended recipient 22 of the content stored on the digital media 18. Thus, the profile information 14 contains various fields such as contact name, email address, company name, phone number, website, etc.

According to a presently preferred embodiment, each digital media 14 contains a content identifier 24 that identifies the digital content 12. The content identifier 24 is used to uniquely identify to the host 16 the type of content information viewed by the viewer 22.

The digital content 12 is packaged or enveloped by a packaging program 26 such as InstallShield® DemoShield®. The enveloping or packaging software 26 provides an interface for viewing the content 12. Additional functions performed by the software 26 will be explained below. Optimally, the enveloping program or package 26 will automatically initiate when the media 14 is inserted or mounted into the recipient's computer 28.

Figure 2A:
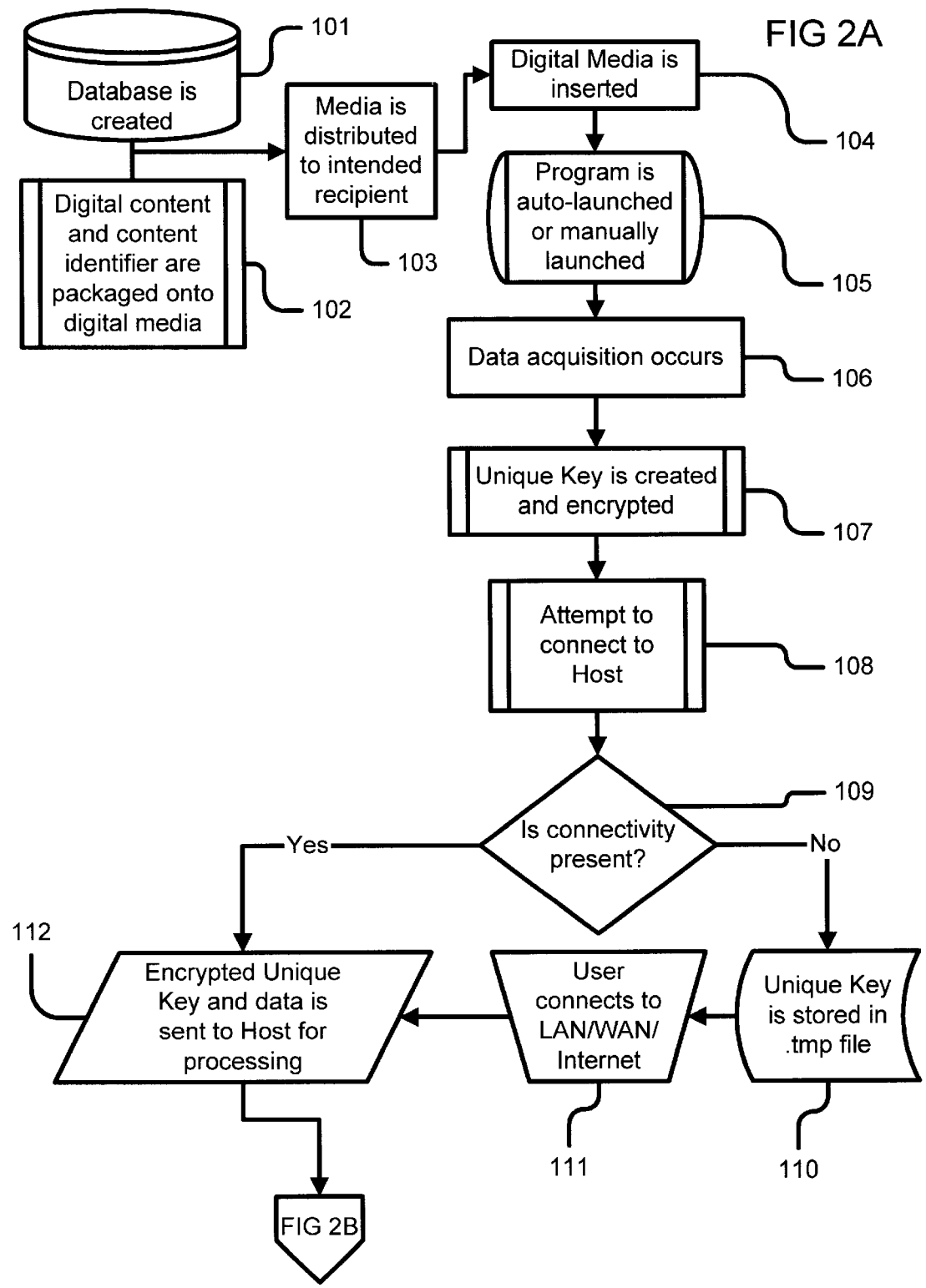
FIGS. 2A and 2B collectively form a flow diagram of the present invention.
Figure 2B:
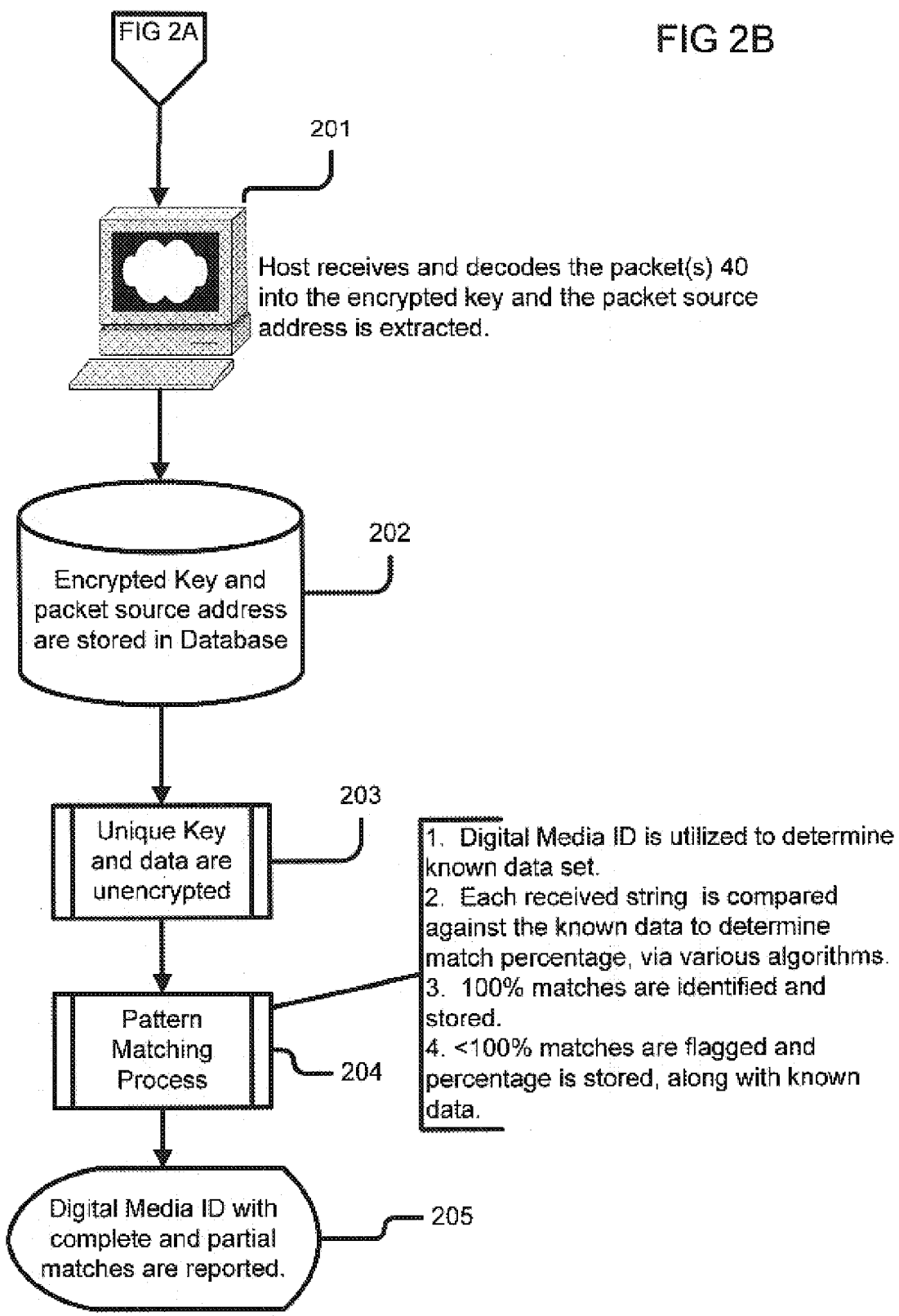

FIGS. 2A and 2B collectively form a flow diagram of the process of the present invention.

As shown in FIGS. 2A and 2B, the process of the present invention begins with the creation of the database 20 of profile information 14 (step 101), packaging of the content (step 102) and the distribution of the digital media 18 to the intended recipient's 22 (step 103). It should be appreciated that the order of steps 101 and 102 are interchangeable.

Next the recipient 22-a of the digital media 18 inserts the media 18 into his/her computer 28 (step 104).

The packaging software 26 automatically launches or the user initiates execution of the packaging software 26 to access the stored digital content 12 (step 105).

In addition to providing the user with an interface for accessing the stored digital content 12, the packaging software 26 browses the user's computer 28 and acquires identifying data 30 regarding the user (step 106). The identifying data 30 is collected from the system registration (Windows® Registry), configuration files, and other information stores contained on the viewer's computer.

Although not specifically illustrated, the packaging software 26 may optionally track the user's interaction with the stored digital content 12.

One of ordinary skill in the art will appreciate that there are many different methods for tracking a user's interaction with the stored digital content 12. The specific method for tracking the portions of the digital content accessed by the recipient does not form part of the claimed invention. See U.S. Pat. No. 6,035,332 and U.S. Pat. No. 6,418,471B1 for examples.

The packaging software 26 will optionally prompt the recipient 22-a for voluntary information, such as name, phone number, email address, interest in the digital content of the media, etc.

As will be appreciated by one of ordinary skill in the art, the source(s) for gathering the identifying data 30 will vary depending on the operating system 28-a executing on the recipient's computer 28. Moreover, the type and quantity of identifying data 30 collected will vary depending on what information is loaded on the recipient's computer 28.

Figure 3:
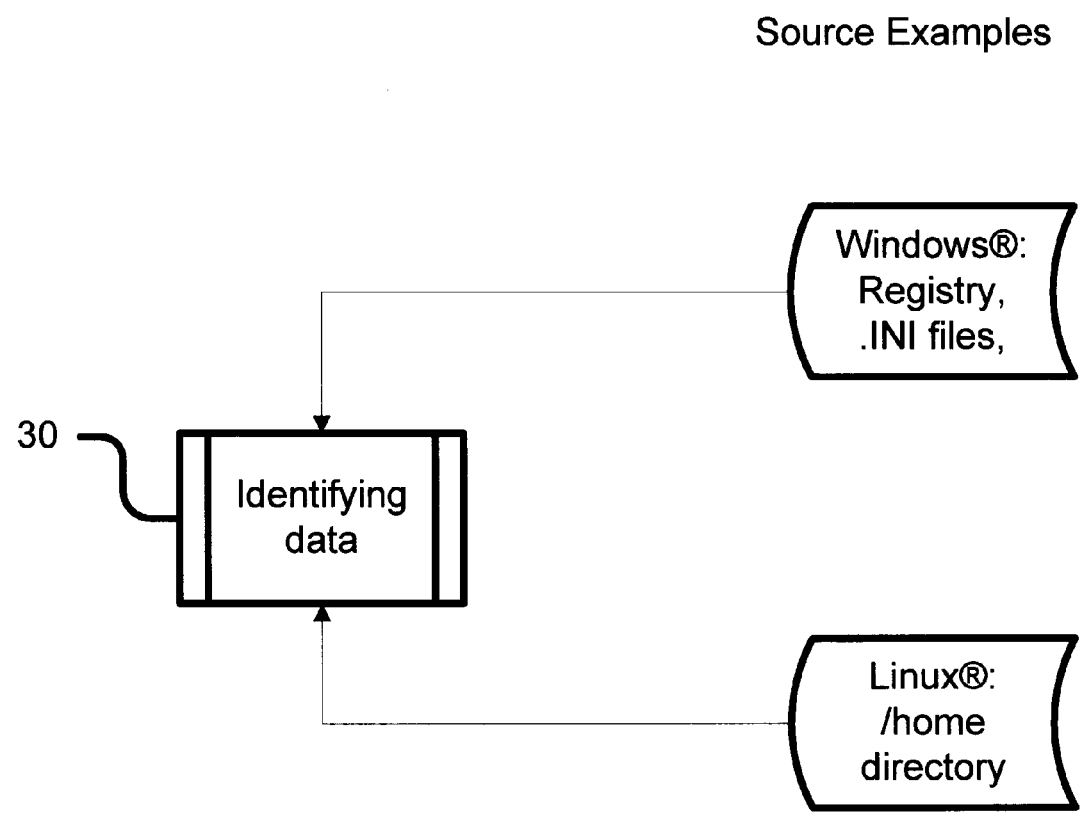
FIG. 3 is a block diagram showing operating system dependent sources for collecting identifying data.

FIG. 3 is a block diagram showing the operating system dependent sources of identifying data 30. The present invention is not limited to any specific operating system 28-a or source of identification information. Rather, the present invention is primarily concerned with the gathering and transmitting identification information for subsequent pattern matching to determine whether the actual recipient 22-a is the intended recipient 22.

Figure 4A:
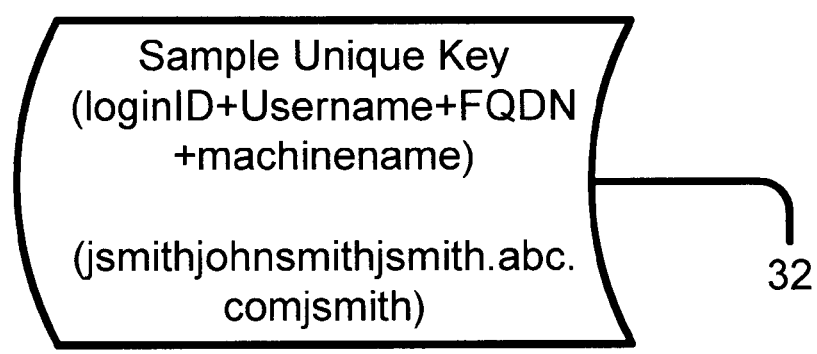
FIG. 4A is a example of a key encoded from identifying data.

FIG. 4A is a sample key 36 encoded from identifying data. The key shown in FIG. 4A is merely an illustration of the type of key 36. As previously described herein, the identifying data will vary depending on the operating system 28-a of the recipient's computer 28. Consequently, the data contained within the key 36 will vary.

According to a preferred embodiment, the content identifier 24 is included in the identifying data 30.

According to a presently preferred embodiment, the packaging software 26 creates and encrypts a unique key 32 from the identifying data 30 (step 107).

One of ordinary skill in the art will appreciate that encryption of the identifying data 30 within the key 32 is optional. Further, it will be appreciated that the there are many ways of creating and encrypting the key 32. The specific method for encrypting the identifying data 30 does not form part of the claimed invention.

Next, the packaging software 26 checks for the presence of an active network connection 34 (LAN, WAN, internet) to the host computer 16 (steps 108 and 109).

If an active network connection 34 is detected then the software 26 transmits the key 32 to the host computer 16 (step 112). Otherwise, the software 26 stores the key 32 in a temporary file 36 (step 110) for later transmittal to the host 16 (step 111).

If no active network connection 34 is detected (step 109) then the packaging software 26 prompts the viewer 22-a to initiate a network connection 34 (step 111).

Figure 4B:
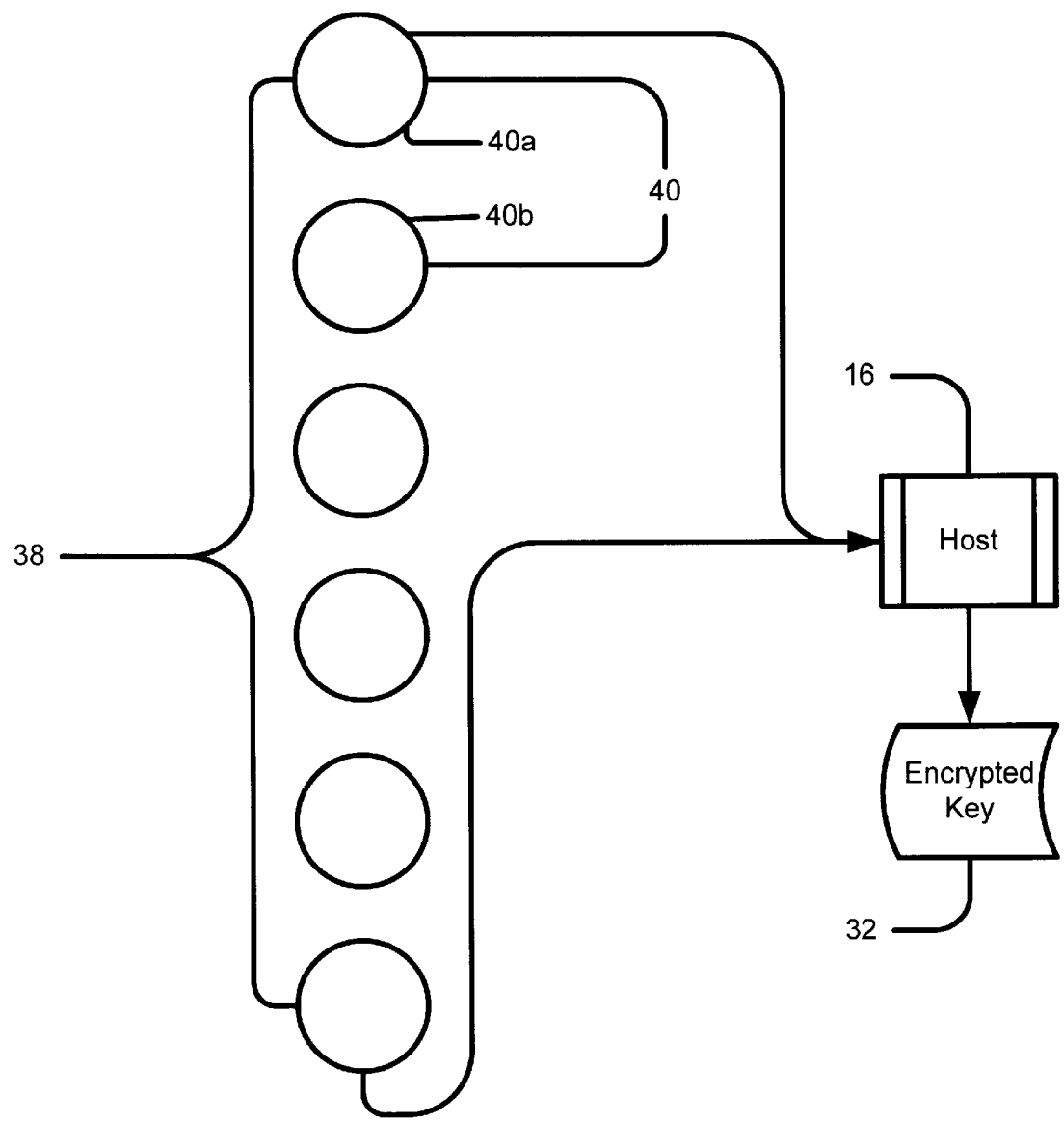
FIG. 4B is a schematic diagram showing an example of how a key is encoded into one or more data packets.
Figure 5:
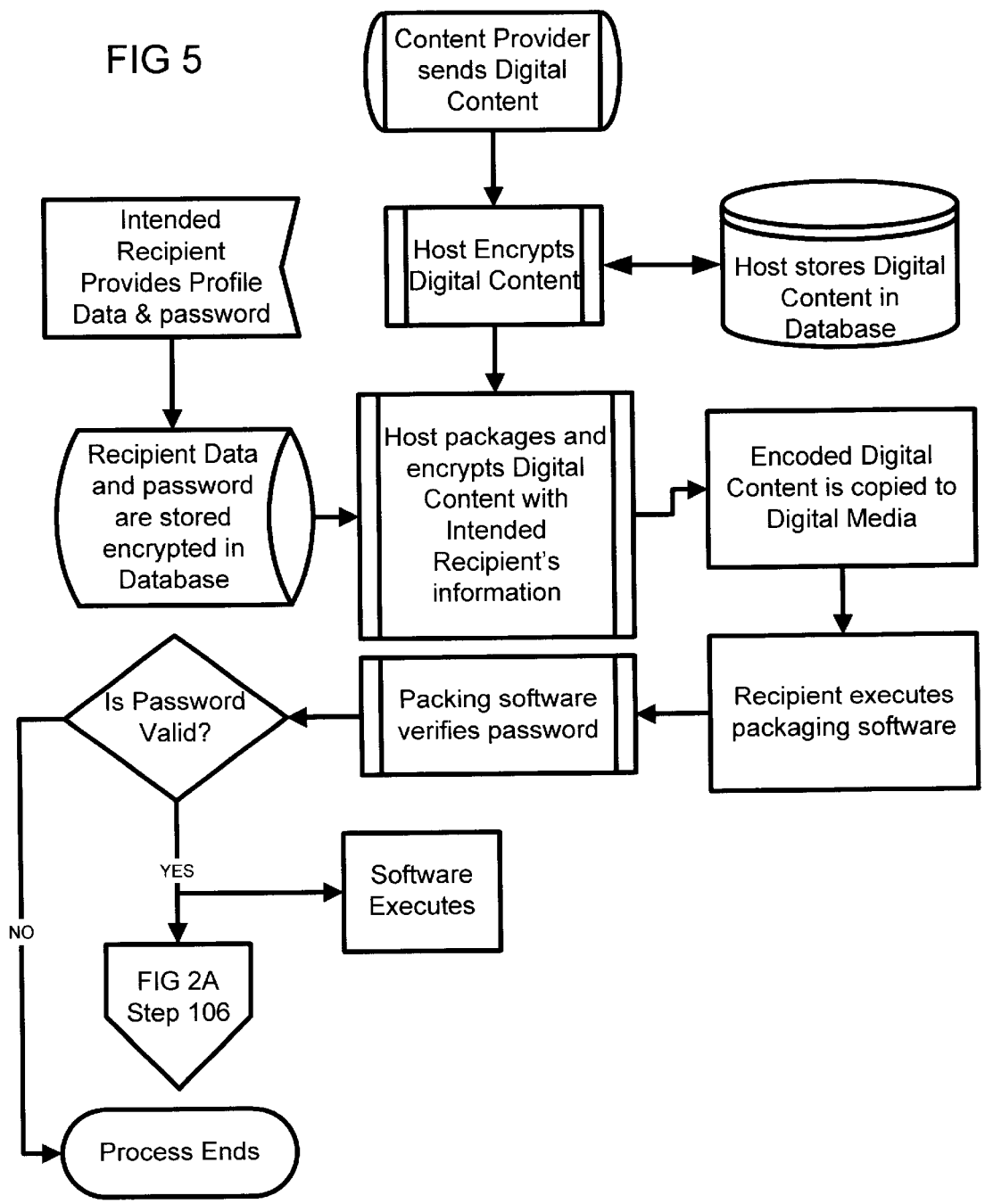
FIG. 5 is a flow diagram according to a second embodiment of the present invention.

As shown in FIG. 4B, the key 32 is encoded into one or more data packets 38 each of which having addressing information 40 identifying the source 40-a and destination 40-b of the data packet 38.

Turning now to FIG. 2B, the host 16 receives and decodes the received data packet(s) 40 into the key 32, optional data (if provided), and extracts the packet source address 40-a (step 201). The encrypted key 32, optional data, and the packet source address information 40-a are then stored into a database 42 (step 202).

If the key 32 was encrypted in step 107 then the key 32 is decrypted (step 203) and decoded to extract the identifying data 28 and the content identifier 24. Otherwise, the process skips to step 204.

According to a preferred embodiment, the database 20 contains multiple datasets 20-a, 20-b, with a distinct dataset being associated with a particular content provider. with the content identifier 24 being used to select the appropriate dataset 20-a, 20-b from the database 20.

The content identifier 24 may further be used to identify the content on the digital media 18. Thus, if a content provider 10 has distributed several different types of content 12, then the content identifier 24 may be used associate the received data with the content 12.

Pattern matching software 44 (FIG. 1), such as Oracle® DB, compares the identifying data 30 to the profile information 14 contained in data set 20-a 9 step 204) and outputs a percentage match (step 205).

Pattern matching software 44 such as Oracle® DB and the like is known in the art and is readily available. The specific software 44 used for pattern matching is unimportant so long as it is capable of text cross-referencing or data reconciliation.

The privacy protection of the content recipient 22-a is an important feature of the present invention. To allay potential concerns regarding the disclosure of confidential and/or personal information, it is contemplated that the host 16 will not disclose to the content provider 10 information which was not voluntarily provided by the recipient 22-a with the exception of identity data 30 which was already in the possession of the content provider 10 or which was in the public domain.

Information which was voluntarily provided by the recipient 22-a will be shared with the content provider 10 regardless of whether the identifying data 30 matches the profile information 14 in the database 20.

Moreover, information specifying the type of content and the portions of the content 12 accessed by the recipient 22-a may also be shared with the content provider 10 regardless of whether the identifying data 30 matches the profile information 14 in the database 20.

In addition, the content provider 10 is provided with the results of the pattern matching analysis.

As noted above, the matching software 44 compares the profile information 14 provided by the content provider 10 with the identifying data 30 gathered by the software 26.

If the pattern matching software 44 finds an exact match with one of the intended recipient profile records 14 in the database 20, then the host computer 16 will generate a report containing the identity of the recipient 22-a.

If the pattern matching software 44, using user specified criteria, does not find an exact match but finds a partial or inexact match then the host 16 will generate a report to the content provider 10 regarding possible matches between the profile information 14 and the actual recipient 20-a.

Thus for example, if the intended recipient 22 is "John Smith" and the actual recipient 22-a is "J Smith" then the pattern matching software 44 would report an inexact match, and would identify the profile records 14 which partially match the identifying data 30 and would specify which fields of the records 14 partially match.

Finally, if the pattern matching software 44 does not find either an exact or partial match, i.e., mismatch, then the host 16 will report the mismatch to the content provider 10.

In the event of the host 16 is unable to find an exact match (e.g., partial match or no match at all), the host 16 may optionally attempt to determine the identity of the recipient 22-a from the network address 40-a such as the internet protocol address of the computer which transmitted the key 32 to the host 16. Notably, the host 16 will cross-reference the network address 40-a with a list of network address owners maintained by the various public internet registries 46 and domain names services 48, and will report the registered owner of the network address to the content provider 10.

One of ordinary skill in the art will appreciate that the key 32 may be transmitted to the host 16 either directly or via a proxy 50. In the event that the key is transmitted via the proxy 50 then the host 16 will only be able to report the registered owner of the network address of the proxy 50.

According to a further aspect of the invention a unique serial number 52 is permanently recorded to the physical digital media 18 and associated with a profile information record 14 in the database 20. This aspect of the invention allows for further reconciliation of the digital media's 18 physical distribution by being able to acknowledge that the recipient 22-a is the intended recipient 22. In the case that the identifying data 30 acquired from the recipient's computer 28 does not match the intended recipient's 22 profile information 14, it can be assumed that the physical digital media 18 did not reach its intended recipient 22.

Likewise, if the intended viewer 22 does access the digital media 18 and then decides to share the physical digital media 18, the unique serial number 52 recorded on the physical digital media 18 can provide additional information regarding the other recipients 22-a and their experience with the physical digital media 18.

FIGS. 4A and 4b collectively define a flow diagram of a second embodiment of the present invention.

The use of similar reference numerals is intended to identify identical or similar processes.

The second embodiment is intended to prevent unauthorized access to the content 12 stored on the media 18. Moreover, the second embodiment provides feedback to the content provider 10 regarding whether the media 18 is being loaded or mounted onto multiple computers 28.

According to this embodiment the digital content 12 is protected to allow only the intended recipient 22 access to the digital content of the digital media 18. Moreover the packaging software 26 of the second embodiment includes the ability to identify the intended recipient 22 by utilizing a password 15 provided by the intended recipient 22.

Each time the media is executed the software 26 gathers identifying data from the computer 28 and transmits the data to the host. The host verifies whether the computer 28 matches the profile information provided by the original purchaser, and tracks the number of times a given media 18 has been loaded onto different computers.

In this embodiment of the current invention the content provider 10 provides digital content 12 to the host 16 (step 400). The host 16 encrypts and stores the digital content in a database 21 which may be a part of database 20 or may form its own distinct database (step 402).

Whereas in the previous embodiment the content provider 10 provided the profile information 14, according to the second embodiment the intended recipient 22 provides the host 16 with the profile information 14 and a password 15 (step 406). The profile information 14, password 15 and a unique serial number 52 are stored in the database 20 (step 408). An optional step of encrypting the profile information 14 and/or password 15 (step 407) may be provided between steps 406 and 408.

The host 16 utilizes the profile information 14 and password 15 to encrypt all or portions of the digital content 12 and the packaging software 26 (step 410).

The serial number 52, and the encrypted digital content 12 and packaging software 26 are then copied to the digital media 18 and distributed to the intended recipient 22 (step 412).

The recipient 22-a inserts or mounts the digital media 18 which then executes the packaging software 26 (step 414). Upon execution, the recipient is prompted to provide the password 15 necessary to decrypt the digital content 12 (step 416). If the recipient 22-a provides the correct password 15, then the digital content 12 will execute (step 422) and will contemporaneously gather and transmit the identifying data 30 as described in FIGS. 2A and 2B, Steps 106 through 205).

The preferred embodiments of the system for tracing the distribution of physical digital media of the present invention are disclosed above. However, other embodiments will be apparent to one of ordinary skill in the art from consideration of the specification. It is intended that the specification and examples be considered as exemplary only, with the true scope and spirit of the invention being indicated by the following claims.

What is claimed is:

1. A method for tracing the distribution of physical digital media and reporting feedback to a content provider regarding whether the profile of the use of the physical digital media corresponds to a known profile, comprising the steps of:

providing a host computer with a database of user profile records;

enveloping digital content within packaging software, the packaging software providing an interface for accessing said digital content;

recording the enveloped digital content and a content identifier on the physical digital media, the content identifier identifying at least one of a type of said digital content and the content provider;

distributing the digital media to a user;

mounting and executing the digital media on the user's computer;

the packaging software gathering identifying data identifying the user's profile from the user's computer to facilitate determining whether the user's profile corresponds to a known profile and encoding the identifying data into a key;

the packaging software searching for an active network connection and transmitting the key to the host computer if an active network connection is located;

wherein communications between the host and the user's computer are uni-directional, flowing from the user's computer to the host;

receiving the key on the host computer and decoding the key into identifying data, performing pattern matching to analyze matches between the identifying data and the database of user profile records;

reporting information to the content provider identifying user profile record(s) which at least partially match the identifying data.

2. The method according to claim 1, wherein:

the key is transmitted to the host through one of a direct network connection and through a proxy.

3. The method according to claim 3, further comprising the step of:

capturing on the host computer the network address of the computer which transmitted the key to the host computer;

cross-referencing the network address with at least one of an internet registry and a domain name service to determine the owner of the network address, and reporting the name of the owner to the content provider.

4. The method according to claim 1, further comprising a step of encrypting the key prior to transmitting the key to the host computer.

5. The method according the claim 1, wherein the key includes information identifying the portion(s) of the content accessed by the user.

6. The method according to claim 1, further comprising the steps of:

prompting the user to provide voluntary information;

encoding the voluntary information into the key; and providing the content provider with the voluntary information.

7. The method according to claim 1, further comprising the steps of:

recording a unique serial number on each digital media;

associating a selected said serial number with each user profile record;

wherein the packaging software reads the serial number from the media and includes the serial number in the identifying data encoded into the key; and reporting to the content provider information identifying the user profile record corresponding to the serial number decoded from the key.

8. A method for tracing the number of times digital content is accessed by different computers, where a computer is judged to be distinct if identifying data gathered from the computer does not match stored user profile data, comprising the steps of:

enveloping digital content within packaging software, the packaging software providing an interface for accessing said digital content;

recording on the physical digital media the unique serial number, the encrypted digital content and the packaging software;

each time the digital media is mounted and executed, the packaging software reads the serial number from the digital media, gathers identifying data from the user's computer and encodes the serial number and identifying data into a key;

the packaging software searches for an active network connection and transmits the key to the host computer if an active network connection is located;

where communications between the user's computer and the host are uni-directional, flowing from the user's computer to the host;

receiving the key on the host and decoding the key into the identifying data and the serial number;

performing pattern matching to analyze matches between the identifying data and the user profile records; and reporting to the content provider information identifying the user profile record(s) which at least partially match the identifying data.

9. The method according to claim 8 further comprising the step of:

storing in the database of user profile records the identifying data and the serial number if no match is found between the identifying data and the user profile records.

10. The method according to claim 1, wherein the packaging software prompts the user to initiate a network connection if no active network connection is located and transmits the key to the host upon detection of an active network connection.

* * * * *